J. Smith.
Grain Drill.
Nº 36,969.
Patented Nov. 18, 1862.

Witnesses
G.S.C. Smith
A.W. Brinkerhoff

Inventor
Jona Smith
by his attorney
A.B. Little

UNITED STATES PATENT OFFICE.

JONATHAN SMITH, OF TIFFIN, OHIO.

IMPROVEMENT IN GRAIN-DRILLS.

Specification forming part of Letters Patent No. 36,969, dated November 18, 1862.

*To all whom it may concern:*

Be it known that I, JONATHAN SMITH, of Tiffin, in the county of Seneca and State of Ohio, have invented certain new and useful Improvements in Seed-Drills; and I do hereby declare that the following is a description thereof in terms which now appear to me to be sufficiently full, clear, and exact, reference being had to the annexed drawings, making a part of this specification, in which—

Figure 1:
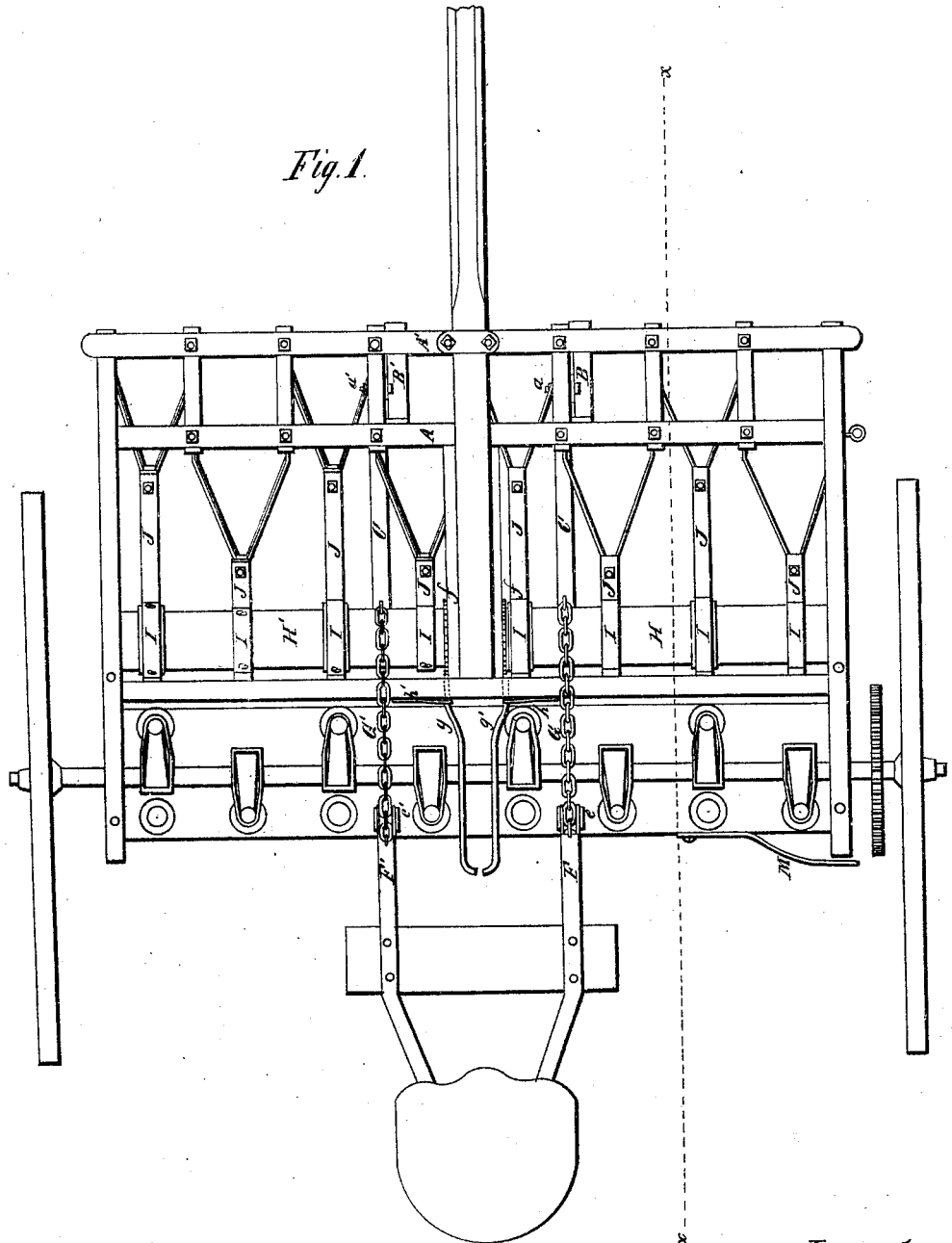
Figure 2:
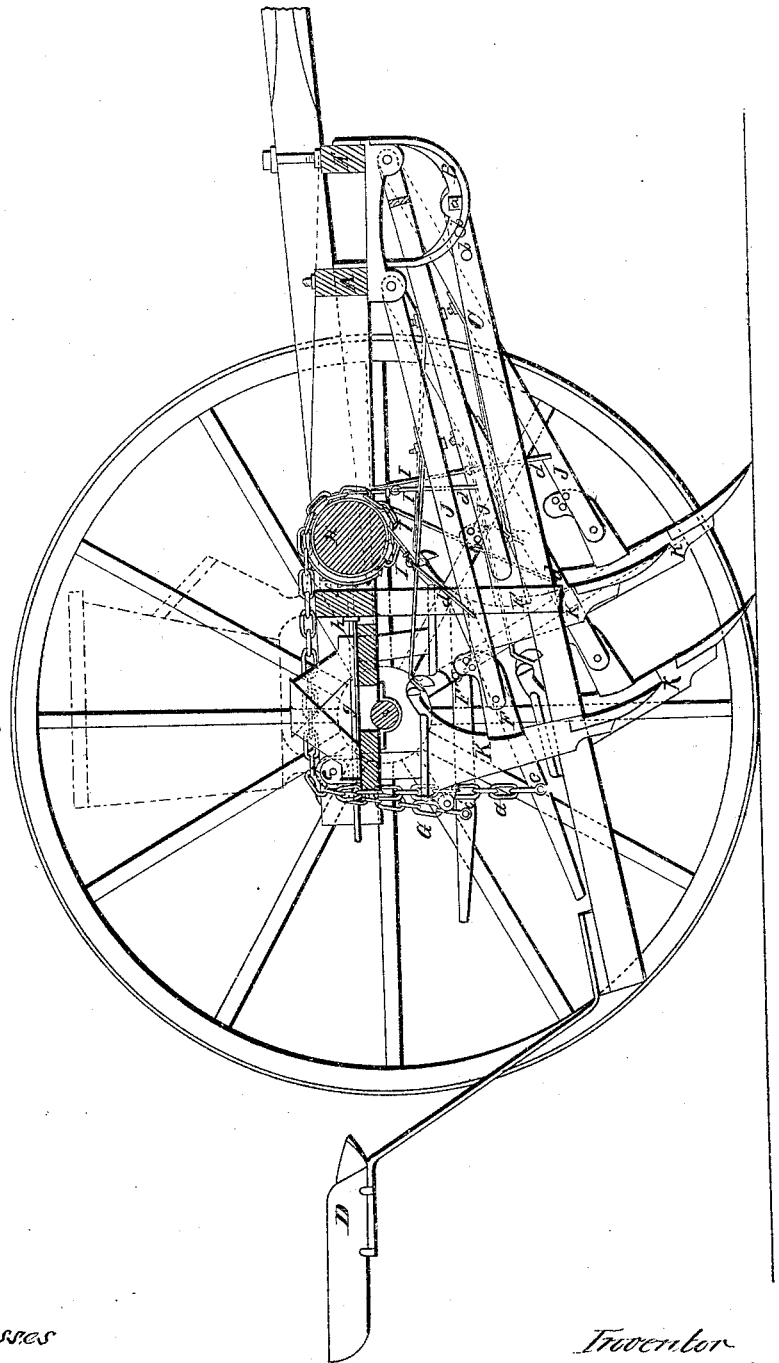
Figure 3:
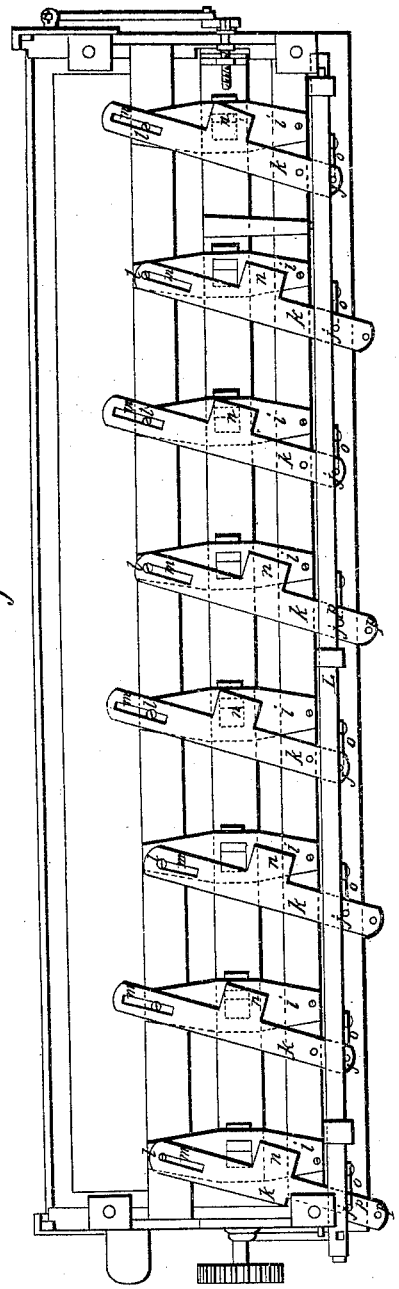
Figure 4:
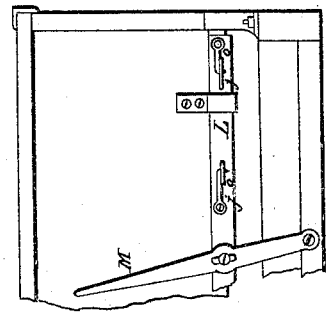

Figure 1 is a top view with the seed-box removed; Fig. 2, a vertical section in the line $x$ $x$ of Fig. 1; Fig. 3, a view of the under side of the seed-box, and Fig. 4 a rear view of a section of the seed-box.

The nature of my invention consists, first, in suspending the seat frame or bars from the under side of the main frame of the machine, so that the driver's seat may be placed so low as to enable him to see and regulate the operation of the furrow-openers, as well as that of the upper parts of the machine; second, in the application to the machine of treadles or levers in combination with separate lever-drums, whereby the whole or a part of the teeth may be elevated at the will of the operator, and without moving from his seat, for the purpose of avoiding intervening obstacles, and to facilitate the turning of the machine at the end of its path; third, in combination with the said treadles or levers and lever-drums, providing the machine with ratchet-wheels and spring-pawls, whereby the depth the teeth shall penetrate the ground may be regulated and determined, and whereby, also, the whole or a part of the teeth may be retained at any desired elevation above the ground; and fourth, in so constructing and applying the slides to the under side of the seed-box that by moving the connecting or slide bar either to the right or left any desired number of the discharge-holes may be made to remain open or closed at will.

To enable others skilled in the art to make and use my invention, I will proceed to describe its construction and operation.

To the front cross-bars, A A', of the main frame of the machine are bolted the yokes or hangers B B', to which are connected by means of the screw-rods $a$ $a'$ the front ends, C C', of the frame that supports the attendant's seat D, the said front ends being provided with several holes, $b$, for the purpose of adjustment. This frame extends rearwardly, and passes through stirrups E E', bolted to one of the cross-beams near to and in front of the axle, which keep the driver's or attendant's seat at its proper elevation during the operation of the machine on level ground. Within the stirrups E E' are jointed the front ends of the treadles or levers F F', the rear ends of which extend back to the foot-board of the driver's seat. The chains G G' are attached at one end thereof to the said treadles or levers at $c$ $c'$, and extend up over grooved pulleys $e$ $e$ and around the lever-drums H H', to which the other ends are connected. The straps I I are also attached, at one end, to and wound round these drums, but in an opposite direction, and extend down to the drag-bars J J' of the teeth K K, to which they are attached at their other ends by means of the links $d$ $d$. The inner ends of the drums H H' are provided with ratchet-wheels $f$ $f'$, with which engage the separate pawls $g$ $g'$, which are kept in contact with the teeth of the ratchet-wheel by means of the springs $h$ $h'$.

To the under side of the bottom of the seed-box are screwed the transverse plates $i$ $i$, having through them holes equal in extent to the discharge-holes in the bottom of the seed-box. Up to those plates are held the slides $k$ $k$ by means of the screw-heads $l$ $l$, working through slots $m$ in their front ends, and the connecting or slide bar L, provided with mortises $j$ $j$, for the reception of their rear ends. These slides $k$ $k$ are provided with rectangular projections $n$ at about the center of their length, and at their rear ends with adjusting-holes $p$ $p'$, for the reception of the hasps $o$ $o$, attached to the connecting or slide bar L, which is operated by means of the lever M.

The operation of these several devices is as follows: The seat frame or bars being suspended under the main frame in the manner described, the seat itself may be stationed so low as to bring the position of the driver down near the ground in the rear of the machine, so that while in his seat he can take in at a glance the whole operation of the machine, can see that every spout is feeding effectively, and that the wheat or grain is being properly covered, and in case rubbish of any kind accumulates on the shovels he can clear them by raising them partly or all together, or by means of a hook it is customary to carry with him; but the seat frame or bars being placed so near the ground, and extending to a considerable distance in the rear of the machine to give a fair view of the operation of all the parts, the whole weight of the drill-frame would rest entirely upon the rear ends of the seat-bars and the point of the tongue in passing dead furrows or gullies, which are frequent in the section of country where my machine is used. Hence the forward ends of these bars are hinged to the forward part of the main frame, so that when the wheels fall into such a depression the rear end of the seat frame or bars touch the ground and rise. By the flexibility of these bars, also, the driver, by dismounting from his seat, may elevate it to pass such ordinary obstructions in the field as the spouts will pass when raised to their highest elevation, the stirrups E E' never extending below this point. The frame or bars of the seat being capable of longitudinal adjustment in a horizontal plane by reason of their forward ends being provided with holes, the seat is capable of a position nearer to or farther from the rear of the axle to accommodate it to the various weights of different attendants.

The treadles or levers, it will be seen, have each its drum, to which is connected one-half of the teeth, so that that half of them may be raised independently or the whole together at the operation of the attendant by applying the feet, and, since the treadles or levers extend to the foot-board, without rising or removing from his seat. By means of the ratchet-wheels and spring-pawls he can also hold the teeth at any desired elevation, either within or without the ground, with the same facility, the handles of the said pawls approaching within reach of the attendant in his seat.

The slides, by means of their rectangular projections and capacity for transverse adjustment, may be arranged so as to close or leave open any or all of the discharge-holes in the seed-box. In the accompanying drawings, Fig. 3, it is shown how this is done. Every other discharge-opening is represented as closed, and it is clear that whether we move the connecting or slide bar either to the right or left it will remain closed. The great advantage of such an arrangement will be obvious to the practical planter.

Having thus described my invention and its mode of operation, what I claim therein as new, and desire to secure by Letters Patent of the United States, is—

1. Suspending the frame or bars that support the driver's seat from the under side of the main frame of the machine, substantially as and for the purposes described.

2. The treadles or levers, arranged as described, when combined with the separate lever-drums for elevating a part or all of the teeth, substantially as set forth.

3. In combination with the treadle or levers and lever-drums, the ratchet-wheels and spring-pawls, as and for the purposes specified.

4. The slides, when constructed with the rectangular projections, and the means described for transverse adjustment, for the purposes and substantially as set forth.

In testimony whereof I have hereunto subscribed my name in the presence of two witnesses.

JONA. SMITH.

Witnesses:
I. R. HAAS,
ROBT. LYSLE, Jr.